Figure 2:
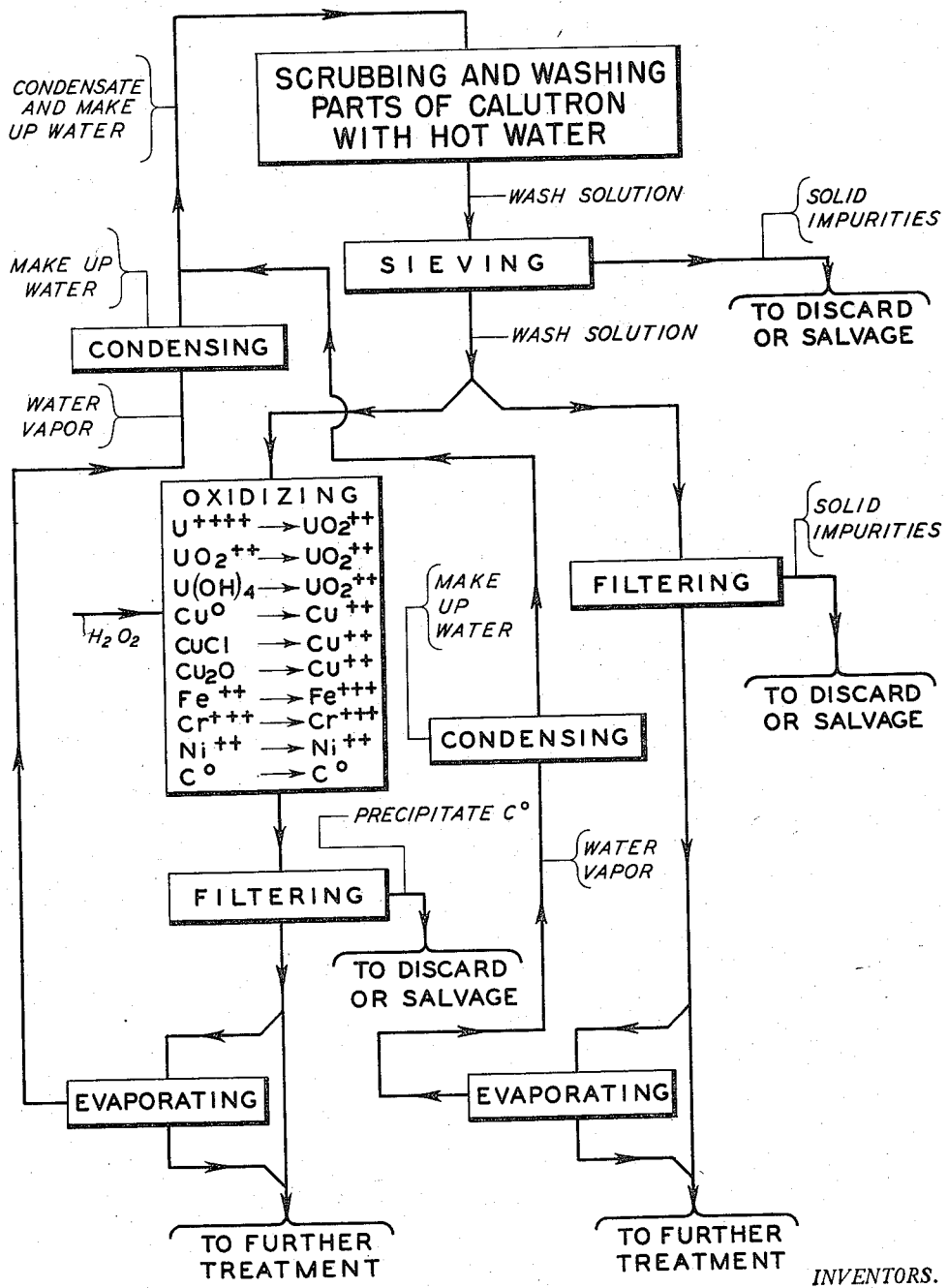

March 24, 1959

G. E. MACWOOD ET AL 2,879,130

PROCESS FOR RECOVERING URANIUM

Filed Dec. 11, 1945

5 Sheets-Sheet 1

Fig. 1

INVENTORS.
GEORGE E. MAC WOOD
COLEMAN D. WILDER
BY DAVID ALTMAN

ATTORNEY.

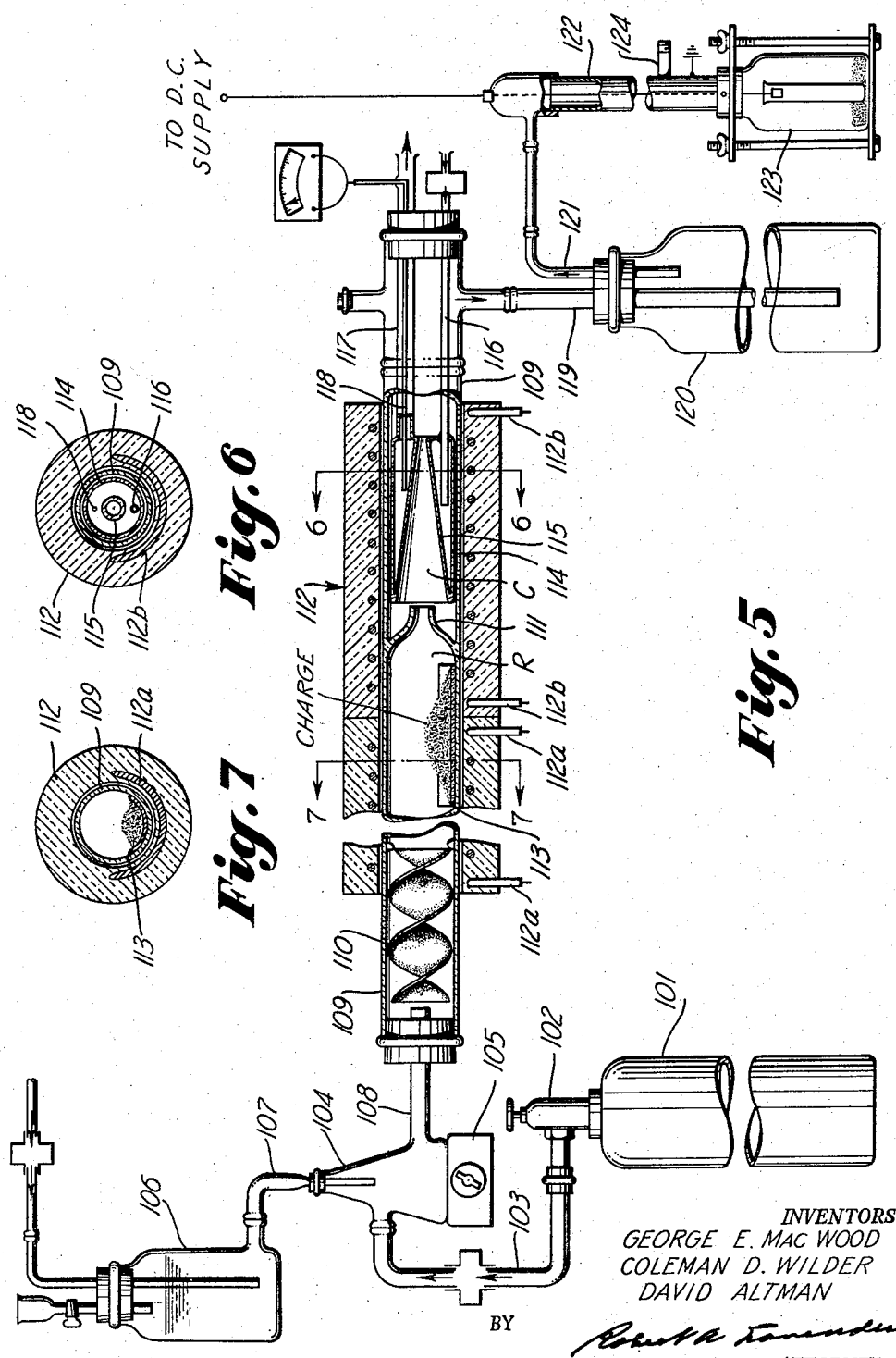

United States Patent Office 2,879,130
Patented Mar. 24, 1959

2,879,130

PROCESS FOR RECOVERING URANIUM

George E. MacWood, Berkeley, Calif., Coleman D. Wilder, Oak Ridge, Tenn., and David Altman, Pasadena, Calif., assignors to the United States of America as represented by the United States Atomic Energy Commission Application December 11, 1945, Serial No. 634,312

12 Claims. (Cl. 23—14.5)

This invention relates to the purification of uranium and more particularly to an improved reclamation process that is especially useful for recovering uranium from wash solutions derived from calutrons employed in the calutron method of producing uranium enriched with $U^{235}$.

In the copending application of Ernest O. Lawrence, Serial No. 557,784, filed October 9, 1944, now U.S. Patent 2,709,222, issued May 24, 1955, there is disclosed a "calutron," a machine designed to separate the constituent isotopes of an element containing several isotopes, in order to produce the element enriched with a selected isotope. More specifically, the calutron mentioned is especially designed to produce uranium enriched with the isotope $U^{235}$.

In the copending application of James M. Carter and Martin D. Kamen, Serial No. 532,159, now U.S. Patent 2,758,006, issued August 7, 1956, filed April 21, 1944, there is disclosed an improved process of producing uranium enriched with $U^{235}$ employing the calutron method and comprising first-stage and second-stage calutrons. In accordance with this process, uranium of natural or normal isotopic composition is treated in a first-stage calutron in order to produce as a product uranium singly enriched with $U^{235}$, which uranium singly enriched with $U^{235}$ is treated in a second-stage calutron in order to produce as a product uranium doubly enriched with $U^{235}$, which uranium doubly enriched with $U^{235}$ may be used commercially. In the operation of either a first-stage calutron or a second-stage calutron the compound $UCl_4$ is treated, whereby a residue of the $UCl_4$ is deposited on the parts of the calutron disposed in the source region thereof, metallic uranium enriched with $U^{235}$ is deposited in the first pocket of the calutron, and metallic uranium impoverished with respect to $U^{235}$ is deposited in the second pocket of the calutron. The deposit of $UCl_4$ is recovered by a water wash step and the deposits of metallic uranium are separately recovered by acid wash steps; and the three wash solutions are separately purified, if required, to produce three separate batches of a given compound of uranium. In this process, a first batch of the uranium compound mentioned, produced from the water wash derived from a first-stage calutron, is then converted back to $UCl_4$ for re-treatment in the first-stage calutron, and a second batch of the uranium compound mentioned, produced from the water wash derived from a second-stage calutron, is then converted back to $UCl_4$ for re-treatment in the second-stage calutron.

In view of the minute quantities of the isotope desired recovered by the calutron process, it is of extreme importance to increase the uranium recovery to the highest possible percentage. Such recovery treatment is particularly important in conjunction with the filtrate obtained from the wash water solution derived from the second-stage calutron, in view of the fact that said wash solution constitutes a relatively large volume and the uranium contained therein has been singly enriched with $U^{235}$ due to the previous treatment thereof in the first-stage calutron. Thus, it is of the greatest importance that none of the valuable singly enriched uranium contained in said wash solutions be lost. Moreover, it is of the utmost importance to separate the uranium contained in said solutions from metallic impurities and to reconvert said uranium into a calutron charging stock by the minimum number of process steps and manipulation.

Accordingly, it is an object of the invention to provide an improved process for reclaiming uranium from solutions thereof.

Another object of the invention is to provide an improved process of reclaiming uranium from solutions of the character above-mentioned that may be readily carried out on a commercial scale and in an economical manner.

Another object of the invention is to provide an improved process for recovering the residue of a uranium compound which has been subjected to treatment in a calutron from the parts of a calutron disposed in the source region thereof upon which the residue is deposited.

A further object of the invention is to provide an improved process of recovering metallic uranium enriched with $U^{235}$ from the collector of a calutron upon which the enriched metallic uranium is deposited.

A still further object of the invention is to provide an improved process of purifying uranium which has been recovered from a calutron.

Still another object of the invention is to provide a process of reclaiming uranium from a wash solution derived from a calutron in which the uranium, together with metallic impurities, is precipitated from said solution, the resulting precipitate is chlorinated at an elevated temperature such that the chlorides of uranium and of metal impurities exist largely in the vapor phase, and the uranium chloride is then separated from the remaining metallic chlorides present in the vapor mixture by fractional condensation by virtue of the differences in their relative volatilities.

A still further object of the invention is to provide a process of purifying uranium contained in a wash solution derived from a calutron in which the uranium, together with certain of the metal impurities, is precipitated by ammonia away from the remaining metal impurities in the wash solution and the uranium is then separated from the metal impurities in the precipitate by chlorination of the precipitate and fractional condensation of uranium chloride from the more volatile metallic chlorides thus obtained.

A still further object of the invention is to provide an improved process of reclaiming uranium from a wash solution derived from a calutron and converting the uranium so reclaimed into a suitable compound for recharging a calutron.

A still further object is to provide an improved process for treating uranium in a calutron in which uranium and impurities such as iron, copper, nickel, and chromium contained in a wash solution derived from the calutron are separated, and the separated uranium is converted into a suitable charge for further calutron treatment.

A still further object of the invention is to provide a process of reclaiming uranium from a calutron wash solution containing metallic impurities in which uranium and certain metallic impurities are precipitated with ammonia, the resulting precipitate is chlorinated and converted into volatile metal chlorides by contacting said precipitate with carbon tetrachloride at an elevated temperature and uranium chloride is separated from the resulting volatile metallic chlorides by fractional condensation.

Still another object of the invention is to provide a process of reclaiming uranium from a calutron wash solution containing iron, copper, nickel, and chromium as impurities in which uranium, iron, and chromium are substantially completely precipitated away from copper and nickel in said solution by the addition of ammonia, the resulting precipitate is contacted with carbon tetrachloride vapor at an elevated temperature sufficient to convert the uranium, iron, and chromium in the precipitate into a mixture of their chlorides in vapor phase, and the uranium chloride is fractionally condensed away from the iron and chromium chloride vapors.

Figure 3:
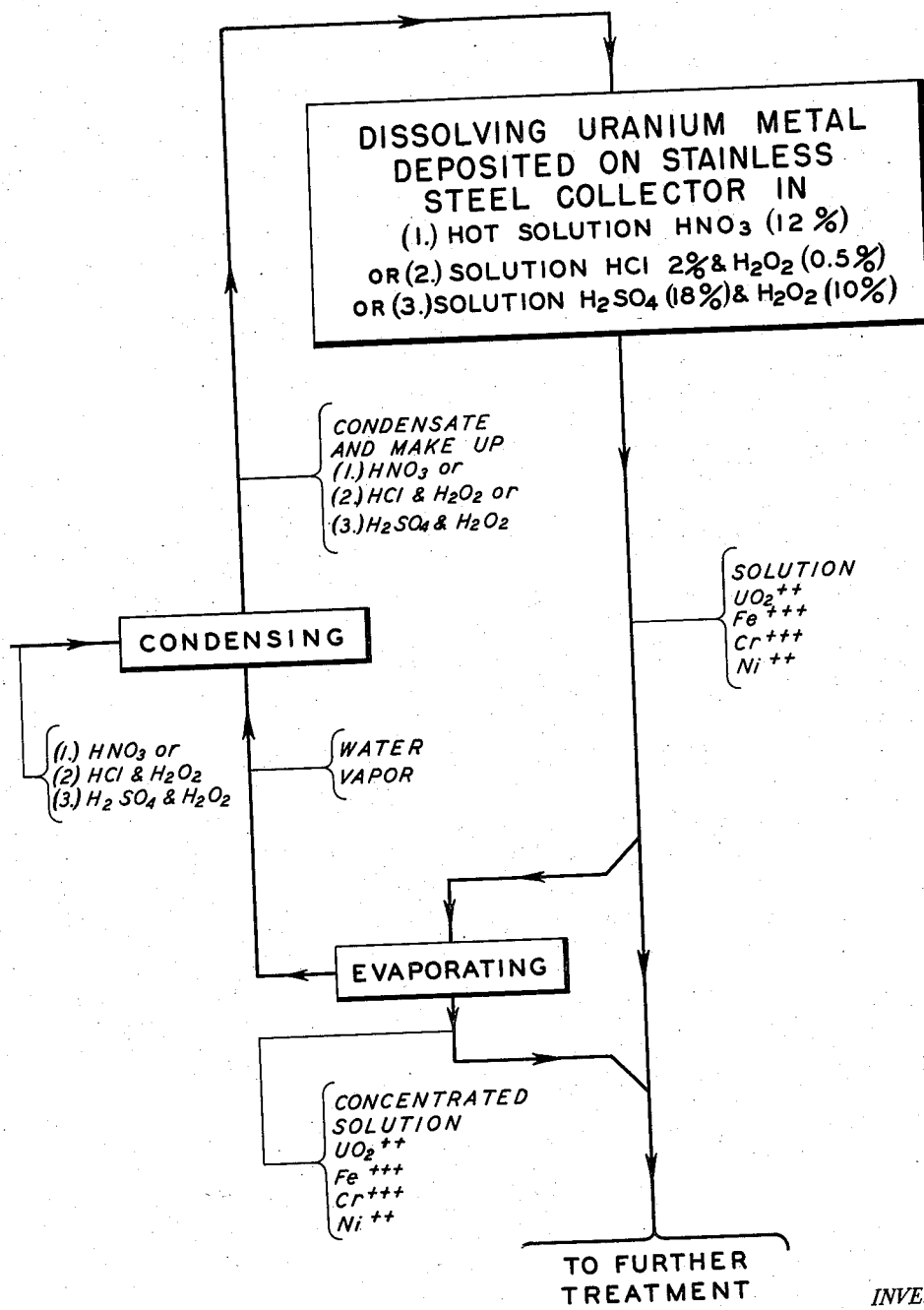
Figure 4:
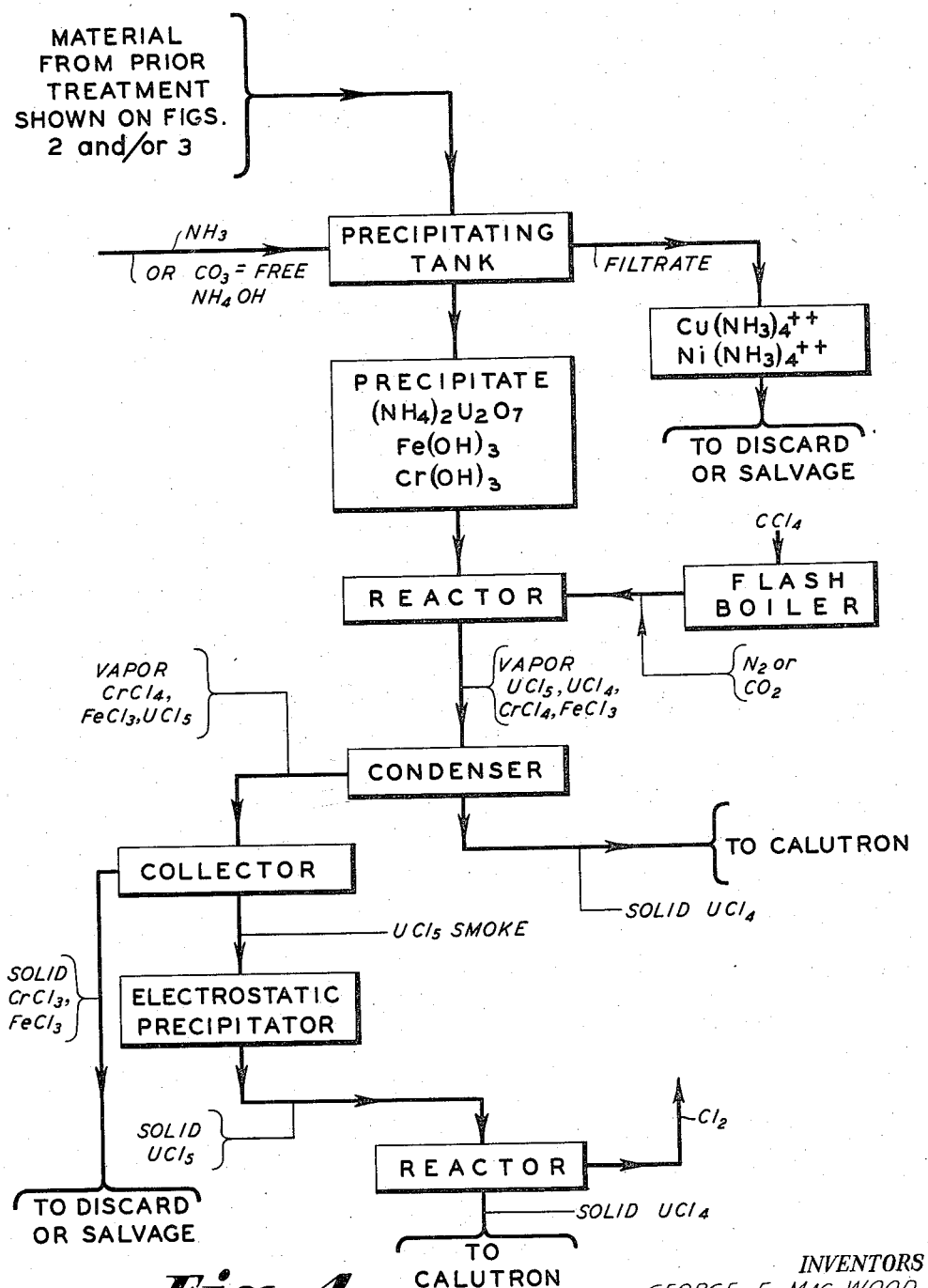

The invention, both as to its organization and method of operation, together with further objects and advantages thereof, will best be understood by reference to the following specification taken in connection with the accompanying drawings in which Figure 1 is a perspective view of a calutron in conjunction with which there may be carried out the process of the invention; Fig. 2 illustrates a portion of the flow diagram of the instant process indicating the recovery of the residue of $UCl_4$ from the parts of the calutron disposed in the source region thereof upon which it is deposited; Fig. 3 illustrates another portion of the flow diagram of the instant process indicating the recovery of the metallic uranium from the collector of the calutron upon which it is deposited; Fig. 4 illustrates a further portion of the flow diagram of the instant process indicating the purification of the uranium contained in the wash solutions together with the conversion thereof to a compound suitable for charging the calutron; and Figs. 5, 6, and 7 illustrate an especially suitable apparatus for carrying out the process of the instant invention.

Referring now more particularly to Fig. 1, there is illustrated a representative example of a calutron 10 of the character noted, which comprises magnetic field structure including upper and lower pole pieces 11 and 12, provided with substantially flat parallel spaced-apart pole faces, and a tank 13 disposed between the pole faces of the pole pieces 11 and 12. The pole pieces 11 and 12 carry windings, not shown, which are adapted to be energized in order to produce a substantially uniform and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer walls 16 and 17, and end walls 18 and 19. The end walls 18 and 19 close the opposite ends of the tubular tank 13 and are adapted to be removably secured in place, whereby the tank 13 is hermetically sealed. Also, vacuum pumping apparatus, not shown, is associated with the tank 13, whereby the interior of the tank 13 may be evacuated to a pressure of the order of $10^{-5}$ to $10^{-4}$ mm. Hg. Preferably, the component parts of the tank 13 are formed of steel, the bottom wall 15 thereof resting directly upon the pole face of the lower pole piece 12, and the top wall 14 thereof being spaced a suitable distance from the pole face of the upper pole piece 11, whereby the top and bottom walls 14 and 15 constitute in effect pole pieces with respect to the interior of the tank 13, as explained more fully hereinafter.

The removable end wall 18 carries an insulator 20 which supports an upstanding charge block 21, provided with a hollow central cavity 22 constituting a charge receiving pocket surrounded by rather thick side walls. Electrical heating elements 23 are embedded in the side walls of the charge block 21 and are adapted to be connected to a suitable source of current, whereby the charge block 21 may be appropriately heated, the charge block 21 being formed of cast steel or the like. Also, the charge block 21 is provided with a removable cover, not shown, and supports a tubular member 24 which in turn supports an arc block 25 formed of carbon or graphite. The arc block 25 is substantially C-shaped in plan, an upstanding slot 26 being formed in the wall thereof remote from the charge block 21. Thus, the arc block 25 is of hollow construction, having a central arc cavity 27 formed therein, the arc cavity 27 formed in the arc block 25 communicating through the tubular member 24 with the cavity 22 formed in the charge block 21.

Also, the removable end wall 18 carries an insulator 28, disposed above the insulator 20, which supports horizontally projecting cathode structure 29, including a filamentary cathode 30 adapted to be connected to a suitable source of current. The cathode structure 29 projects over the upper end of the charge block 21, whereby the filamentary cathode 30 overhangs and is aligned with respect to the upper end of the cavity 27 formed in the arc block 25. Further, an anode 31 is arranged below and in alignment with respect to the lower end of the cavity 27 formed in the arc block 25, the anode 31 being supported by the charge block 21. The filamentary cathode 30 and the cooperating anode 31 are adapted to be connected to a suitable source of current.

Ion accelerating structure, including a pair of upstanding plates 32 formed of carbon or graphite, is supported by insulating structure, not shown, carried by the removable end wall 18. The pair of upstanding plates 32 are arranged in spaced-apart relation in order to define a slit 33 therebetween, arranged in substantial alignment with respect to the slot 26 formed in the wall of the arc block 25. A suitable source of voltage is adapted to be connected between the arc block 25 and the ion accelerating structure, including the plates 32, for a purpose more fully explained hereinafter.

The removable end wall 19 carries an insulator 34 which supports an upstanding collector block 35 formed of stainless steel or the like and provided with two laterally spaced-apart cavities or pockets 36 and 37 which communicate with aligned slots 38 and 39 formed in the wall of the collector block 35 disposed remote from the removable end wall 19. Alternatively, the collector block may be fabricated of steel plate and the inner surfaces of the pockets 36 and 37 lined with stainless steel plates. It is noted that the pockets 36 and 37 are adapted to receive two constituent isotopes of an element which have been separated in the calutron 10, as explained more fully hereinafter. Finally the inner wall 16 carries a number of insulators 40 which support a tubular liner 41 formed of copper or the like, rectangular in vertical cross-section, disposed within the tank 13 and spaced from the walls 14, 15, 16 and 17 thereof. One end of the tubular liner 41 terminates adjacent the accelerating structure, including the plates 32; and the other end of the tubular liner 41 terminates adjacent the collector block 35; the tubular liner 41 constituting an electrostatic shield for the high-velocity ions traversing the curved paths between the slit 33 formed by the plates 32 of the ion accelerating structure and the slots 38 and 39 formed in the collector block 35, as explained more fully hereinafter.

In view of the above description, it will be understood that the parts of the calutron 10 carried by the removable end wall 18 constitute a source unit, and the end of the tank 13 disposed adjacent the source unit constitutes the source region of the calutron. Similarly, the parts of the calutron carried by the removable end wall 19 constitute a collector unit, and the end of the tank 13 disposed adjacent the collector unit constitutes the collector region of the calutron.

Considering now the general principle of operation of the calutron 10, a charge comprising a compound of the element to be treated is placed in the charge pocket 22 in the charge block 21, the compound of the element mentioned being one which may be readily vaporized. The cover, not shown, is then secured on the charge block 21 and the end walls 18 and 19 are securely attached to the open ends of the tank 13, whereby the tank 13 is hermetically sealed. The various electrical connections are completed and operation of the vacuum pumping apparatus, not shown, associated with the tank 13 is initiated. When a pressure of the order of $10^{-5}$ to $10^{-4}$ mm. Hg is established within the tank 13, the electric circuits for the windings associated with the pole pieces 11 and 12 are closed and adjusted, whereby a predetermined magnetic field is established therebetween, traversing the tank 13. The electric circuit for the heating elements 23 is closed, whereby the charge in the charge pocket 22 in the charge block 21 is heated and vaporized. The vapor fills the charge pocket 22 and is conducted through the tubular member 24 into the cavity 27 formed in the arc block 25. The electric circuit for the filamentary cathode 30 is closed, whereby the filamentary cathode 30 is heated and rendered electron-emissive. Then the electric circuit between the filamentary cathode 30 and the anode 31 is closed, whereby an arc discharge is struck therebetween, electrons proceeding from the filamentary cathode 30 to the anode 31. The electrons proceeding from the filamentary cathode 30 to the anode 31 break up the molecular form of the compound of the vapor to a considerable extent, producing positive ions of the element which is to be enriched with a selected one of its isotopes.

The electric circuit between the arc block 25 and the ion accelerating structure, including the plates 32, is completed, the plates 32 being at a high negative potential with respect to the arc block 25, whereby the positive ions are attracted and accelerated to the voltage impressed between the arc block 25 and the ion accelerating structure. More particularly, the positive ions proceed from the interior of the cavity 27 formed in the arc block 25, through the slot 26 formed in the wall thereof, and across the space between the plates 32 and the adjacent wall of the arc block 25, and thence through the slit 33 formed between the plates 32 into the interior of the tubular liner 41. The high-velocity positive ions form a vertical upstanding ribbon proceeding from the cavity 27 formed in the arc block 25 through the slot 26 and the aligned slit 33 into the tubular liner 41.

The collector block 35, as well as the tubular liner 41, is electrically connected to the ion accelerating structure, including the plates 32, whereby there is an electric field-free path for the high velocity positive ions, disposed between the plates 32 and the collector block 35 within the tubular liner 41. The high-velocity positive ions entering the adjacent end of the liner 41 are deflected from their normal straight-line path and from a vertical plane, passing through the slot 26 and the slit 33, due to the effect of the relatively strong magnetic field maintained through the space within the tank 13 and the liner 41 through which the positive ions travel, whereby the positive ions describe arcs, the radii of which are proportional to the square roots of the masses of the ions and consequently of the isotopes of the element mentioned. Thus, relatively light ions, a relatively light isotope of the element, describe an interior arc of relatively short radius and are focused through the slot 38 into the pocket 36 formed in the collector block 35; whereas relatively heavy ions, a relatively heavy isotope of the element, describe an exterior arc of relatively long radius and are focused through the slot 39 into the pocket 37 formed in the collector block 35. Accordingly, the relatively light ions are collected in the pocket 36 and are de-ionized to produce a deposit of the relatively light isotope of the element therein, while the relatively heavy ions are collected in the pocket 37 and are de-ionized to produce a deposit of the relatively heavy isotope of the element therein.

After all of the charge in the charge pocket 22 formed in the charge block 21 has been vaporized, all of the electric circuits are interrupted and the end wall 18 is removed so that another charge may be placed in the pocket 22 and subsequently vaporized in the manner explained above. After a suitable number of charges have been vaporized in order to obtain appropriate deposits of the isotopes of the element in the pockets 36 and 37 of the collector block 35, the end wall 19 may be removed and the deposits of the collected isotopes in the pockets 36 and 37 in the collector block 35 may be reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein. In this connection, reference is again made to the copending application of Ernest O. Lawrence for a complete specification of a calutron especially designed for the production of uranium enriched with the isotope $U^{235}$. By way of illustration, it is noted that when the calutron 10 is employed in order to produce uranium enriched with $U^{235}$, the compound of uranium which is suggested as a suitable charge in the charge block 21 is $UCl_4$, as this compound may be readily vaporized and the molecular form of the vapor may be readily broken up to form positive ions of uranium with great facility. In this case, uranium enriched with $U^{235}$ is collected in the pocket 36 of the collector block 35, and uranium comprising principally $U^{238}$ is collected in the pocket 37 of the collector block 35. Also, it is noted that from a practical standpoint, the deposit of uranium collected in the pocket 36 of the collector block 35 contains considerable amounts of $U^{238}$, in view of the fact that this isotope comprises the dominant constituent of ordinary uranium. Furthermore, the deposit of uranium collected in the pocket 36 of the collector block 35 contains a considerably increased amount of $U^{234}$, in view of the fact that it is not ordinarily feasible to separate $U^{234}$ and $U^{235}$ in the production of relatively large quantities of uranium enriched with $U^{235}$ for commercial purposes. Accordingly, in this example the uranium deposited in the pocket 36 of the collector block 35 is considerably enriched, both with $U^{234}$ and $U^{235}$, and considerably impoverished with respect to $U^{238}$ as compared to natural or normal uranium.

During the operation of the calutron 10 in the production of uranium enriched with $U^{235}$, the compound $UCl_4$ is vaporized in the charge block 21 and conducted through the tubular member 24 into the cavity 27 formed in the arc block 25, where it is subjected to ionization as previously explained. Only a minor fraction (about 5%) of the $UCl_4$ vapor is actually ionized in the cavity 27 formed in the arc block 25 and drawn through the slot 26 due to the ion accelerating structure, including the plates 32. The major fraction (about 95%) of the $UCl_4$ vapor is un-ionized in the cavity 27 formed in the arc block 25 and flows through the slot 26 due to the pressure differential between the cavity 27 and the interior of the liner 41. This major fraction of the $UCl_4$ vapor, being un-ionized, is not at all affected by the ion accelerating structure, including the plates 32, and travels into contact with the various parts of the calutron disposed in the source region thereof, upon which parts it is condensed primarily in the compound form $UCl_4$ as a residue. More particularly, this residue is condensed principally upon the interior of the adjacent end of the liner 41, but to some extent upon the exterior thereof, the walls of the tank 13 in the region of the source and upon the exterior surfaces of the various elements of the source unit including the arc block 25, the charge block 21, etc.

More particularly, the minor fraction of the $UCl_4$ vapor is ionized to form positive atomic ions including $U^+$, $U^{++}$, $Cl^+$ and $Cl^{++}$; and positive molecular ions including $Cl_2^+$, $Cl_2^{++}$, $UCl_4^+$, $UCl_4^{++}$, $UCl_3^+$, $UCl_3^{++}$, $UCl_2^+$, $UCl_2^{++}$, $UCl^+$ and $UCl^{++}$. Of these atomic and molecular ions only the singly ionized atomic ions $U^+$ have the required ratio between mass and charge such that they are focused through the slots 38 and 39 into the pockets 36 and 37 formed in the collector block 35; the atomic ions $U^+$ of masses 234 and 235 focusing through the slot 38 into the pocket 36, and the atomic ions $U^+$ of mass 238 focusing through the slot 39 into the pocket 37, as previously noted.

The doubly ionized atomic ions $U^{++}$ have such a ratio between mass and charge that they are deflected along an arc of shorter radius into engagement with the inner wall of the liner 41, where they are de-ionized to form a deposit thereon. The singly and doubly ionized atomic ions $Cl^+$ and $Cl^{++}$ and the singly and doubly ionized molecular ions $Cl_2^+$ and $Cl_2^{++}$ have such small ratios between mass and charge that they are deflected along arcs of very short radii into engagement with the inner wall of the liner 41 adjacent the source region, where they are de-ionized to form neutral chlorine molecules, which gas is subsequently pumped from the tank 13 due to the operation of the vacuum pumping apparatus previously noted. Similarly, the doubly ionized molecular ions $UCl_4^{++}$, $UCl_3^{++}$, $UCl_2^{++}$ and $UCl^{++}$ have intermediate ratios between mass and charge such that they are deflected along arcs of intermediate radii into engagement with the inner wall of the liner 41 intermediate the source region and the collector region, where they are de-ionized to form a deposit thereon. Finally, the singly ionized molecular ions $UCl_4^+$, $UCl_3^+$, $UCl_2^+$ and $UCl^+$ have large ratios between mass and charge, such that they are deflected along arcs of large radii into engagement with the outer wall of the liner 41 intermediate the source region and the collector region, where they are de-ionized to form a deposit thereon.

Accordingly, it will be understood that, after operation of the calutron 10 to vaporize a reasonable number of charges of $UCl_4$ in the charge block 21, a considerable deposit of $UCl_4$ is formed on the adjacent end of the liner 41, and that a reasonable deposit of metallic uranium, as well as the various uranium chlorides, is formed on the intermediate portion of the liner 41. These deposits represent uranium which contains the various isotopes $U^{238}$, $U^{235}$ and $U^{234}$ in natural or normal amounts such that these deposits should be recovered for recycling purposes as well as to clean the liner 41 and the other parts of the calutron 10 in order to insure efficient operation thereof.

Considering the present process in greater detail with reference to the production of uranium enriched with $U^{235}$, it is pointed out that natural or normal uranium comprises three isotopes, $U^{238}$, $U^{235}$ and $U^{234}$, in the approximate relative abundances 1, 1/139 and 1/16,700 (in numbers of atoms with reference to $U^{238}$), respectively, or approximately 16,700, 120 and 1 atoms, respectively, in 16,821 atoms of a sample. It is highly desirable to prepare large quantities of uranium enriched with the thermal-neutron fissionable isotope $U^{235}$ for commercial purposes, and it has been found that this end can be accomplished by employing the calutron method. However, it is desirable that the uranium product have an enrichment factor with respect to $U^{235}$ of the order of 400, this factor being defined as the quotient obtained by dividing the ratio of $U^{235}$ to $U^{238}$ in the product with the ratio of $U^{235}$ to $U^{238}$ in the original material. Now assuming that the product is enriched by 400 in both $U^{235}$ and $U^{234}$, it comprises $U^{238}$, $U^{235}$ and $U^{234}$ in the approximate relative abundances 1, 400/139 and 400/16,700 (in numbers of atoms with reference to $U^{238}$), respectively, or approximately 16,700, 48,057 and 400 atoms, respectively, in 65,157 atoms of a sample. Thus the enriched uranium product comprises approximately 25.7% $U^{238}$, 73.7% $U^{235}$ and 0.6% $U^{234}$.

In order to obtain this desired enrichment of the uranium product by utilizing the calutron method, it has been found most convenient to use first-stage and second-stage calutrons, the first-stage calutrons employing natural or normal uranium and producing a first-stage enriched product having an enrichment factor of the order of 20 with respect to natural or normal uranium; and the second-stage calutrons employing first-stage enriched uranium and producing a second-stage enriched product having an enrichment factor of the order of 20 with respect to the first-stage enriched uranium, whereby the second-stage enriched uranium product has a final enrichment factor of the order of 400 with respect to natural or normal uranium. By employing the present process, whereby the ultimate enrichment of the final uranium product is obtained in two stages, as indicated above, each of the first-stage and the second-stage calutrons may be operated in the stable range and to give a maximum yield of enriched material.

Accordingly, in the present process it will be understood that in the event the calutron 10 comprises a first-stage calutron, the deposit of uranium in the pocket 37 in the collector block 35 has been impoverished with respect to the desired isotope $U^{235}$, and is recovered therefrom and discarded; while the deposit of uranium in the pocket 36 in the collector block 35 has been singly enriched with respect to the desired isotope $U^{235}$, and is recovered therefrom and subsequently treated in a second-stage calutron. On the other hand, in the event the calutron 10 comprises a second-stage calutron, the deposit of uranium in the pocket 37 in the collector block 35 has been first enriched and then impoverished with respect to the desired isotope $U^{235}$, and is recovered therefrom and analyzed to determine its $U^{235}$ content for possible recycling in a first-stage calutron; while the deposit of uranium in the pocket 36 in the collector block 35 has been doubly enriched with respect to the desired isotope $U^{235}$, and is recovered therefrom for commercial use.

Thus it will be understood that in a first-stage calutron, the deposit of metallic uranium in the pocket 36 in the collector block 35 has been subjected to one treatment and is termed "singly enriched" uranium, the enrichment being with respect to the desired isotope, $U^{235}$; on the other hand, in a second-stage calutron the deposit of metallic uranium in the pocket 36 in the collector block 35 has been subjected to two treatments, and is termed "doubly enriched" uranium, the enrichment being with respect to the desired isotope, $U^{235}$.

Considering now the present process in greater detail, it will be understood that a plant arranged to carry out the process will comprise a relatively large number of first-stage calutrons and a relatively small number of second-stage calutrons, in addition to facilities for handling, storing, recovering, purifying and converting the various metallic and compound forms of uranium. The starting material employed as a charge in the first-stage calutron is $UCl_4$, comprising natural or normal uranium, whereby metallic uranium singly enriched with $U^{235}$ is deposited in the first pocket of the collector and metallic uranium impoverished with respect to $U^{235}$ is deposited in the second pocket of the collector. Also, a large amount of $UCl_4$ is deposited as a residue upon the parts of the first-stage calutron disposed in the source region thereof, the deposit being primarily on the source-region end of the liner. After several charges of $UCl_4$, comprising natural or normal uranium, have been employed in the first-stage calutron, reasonable deposits of metallic uranium have been collected in the first and second pockets of the collector, and the metallic uranium deposits in the collector and the $UCl_4$ residue on the liner are recovered.

More particularly, the metallic uranium singly enriched with $U^{235}$ and deposited in the first pocket of the collector is recovered by an acid wash process, whereby various impurities including iron, chromium and nickel are introduced in the wash solution, due to the fact that the collector of the first-stage calutron which is thus washed with acid is formed of the metals mentioned. Accordingly, the wash solution containing the uranium singly enriched with $U^{235}$ which has been reclaimed contains considerable impurities. This wash solution is stored and subsequently employed as makeup material in a purification process utilized in conjunction with the second-stage calutron, in a manner more fully explained hereinafter. The metallic uranium impoverished with respect to $U^{235}$ and deposited in the second pocket of the collector is recovered by an acid wash process and discarded, as it contains so little $U^{235}$ that further processing thereof is not feasible.

The residue of $UCl_4$ deposited on the parts of the first-stage calutron disposed in the source region thereof, principally upon the liner, is recovered by a water wash process, whereby various impurities including copper, iron, chromium, nickel and carbon are introduced in the wash solution, due to the fact that the various parts of the first-stage calutron which are thus washed with water are formed of the materials mentioned. Accordingly, the wash solution containing natural or normal uranium which has been reclaimed, contains considerable impurities. To this wash solution there is added makeup material in the form of a wash solution derived from the second-stage calutron, and comprising the wash solution from the second pocket of the collector, and containing uranium which has been first enriched with $U^{235}$ in the first-stage calutron and subsequently impoverished with respect to $U^{235}$ in the second-stage calutron, as explained more fully hereinafter. This composite wash solution is then subjected to a combination treatment to purify said wash solution and reconvert the uranium to $UCl_4$. The $UCl_4$ so produced is then employed along with a suitable amount of makeup $UCl_4$ as a charge in the first-stage calutron.

Accordingly, the $UCl_4$ deposited in the source region of the first-stage calutron is treated to render it recyclable therein; the first-stage, enriched uranium is then stored for use in he second-stage calutron and the first-stage, impoverished uranium is discarded.

The starting material employed as a charge in the second-stage calutron is $UCl_4$ prepared and purified as hereinafter described, comprising singly enriched uranium whereby metallic uranium doubly enriched with $U^{235}$ is deposited in the first pocket of the collector and metallic uranium which has been first enriched in the first-stage calutron and then impoverished in the second-stage calutron is deposited in the second pocket of the collector. Also, a large amount of $UCl_4$ is deposited as a residue upon the parts of the second-stage calutron disposed in the source region thereof, the deposit being primarily on the source region end of the liner. After several charges of $UCl_4$ comprising singly enriched uranium have been employed in the second-stage calutron, reasonable deposits of metallic uranium have been collected in the first and second pockets of the collector and the metallic uranium deposits in the collector and the $UCl_4$ residue on the liner are recovered.

More particularly, the metallic uranium doubly enriched with $U^{235}$ and deposited in the first pocket of the collector is recovered by an acid wash process, whereby various impurities including iron, chromium and nickel are introduced in the wash solution, due to the fact that the collector of the second-stage calutron which is thus washed with acid is formed of the metals mentioned. Accordingly, the wash solution containing the uranium doubly enriched with $U^{235}$, which has been reclaimed, contains considerable impurities. This wash solution is then purified in order to eliminate the impurities mentioned; the impurities thus eliminated are discarded or salvaged; and the uranium thus purified is converted into a standard compound of uranium for commercial use. The metallic uranium first enriched with $U^{235}$ and subsequently impoverished with respect to $U^{235}$ and deposited in the second pocket of the collector is recovered by an acid wash process, whereby various impurities including iron, chromium and nickel are introduced in the wash solution, due to the fact that the collector of the second-stage calutron which is thus washed with acid is formed of the metals mentioned. Accordingly, the wash solution containing the uranium first enriched with $U^{235}$ and subsequently impoverished with respect to $U^{235}$ which has been reclaimed contains considerable impurities. The uranium in the wash solution is then analyzed, and in the event it contains at least as much $U^{235}$ as natural or normal uranium, it is employed as makeup material in the purification process utilized in conjunction with the first-stage calutron.

The residue of $UCl_4$ deposited on the parts of the second-stage calutron disposed in the source region thereof; principally upon the liner, is recovered by a water wash process, whereby various impurities including copper, iron, chromium, nickel and carbon are introduced in the wash solution due to the fact that the various parts of the second-stage calutron which are thus washed with water are formed of the materials mentioned. Accordingly, the wash solution containing the singly enriched uranium which has been reclaimed contains considerable impurities. To this wash solution there is added the previously stored makeup material in the form of the wash solution derived from the first-stage calutron and comprising the acid wash solution from the first pocket of the collector of the first-stage calutron and containing singly enriched uranium.

This composite wash solution is then treated as will be hereinafter described to eliminate the impurities mentioned and convert the uranium back to the compound $UCl_4$. This compound of $UCl_4$ is then employed as a charge in the second-stage calutron.

Accordingly, the residue of $UCl_4$ deposited in the source region of the second-stage calutron is treated to render it recyclable therein; the second-stage enriched uranium is converted to a standard compound of uranium to be used commercially; and the second-stage impoverished uranium is stored for use in the first-stage calutron.

Considering now the details of the recovery of the $UCl_4$ residue from the parts of either a first-stage or second-stage calutron deposited in the source region thereof, reference is made to the portion of flow diagram illustrated in Figure 2, the parts of the calutron disposed in the source region thereof, principally the source region end of the liner, are scrubbed and washed with hot water whereby the residue of $UCl_4$ deposited thereon is dissolved; and various impurities including copper, iron, chromium, nickel, and carbon are introduced into the wash water due to the fact that the various parts of the calutron which are thus washed with hot water are formed of the materials mentioned. The wash water is then sieved in order to remove any solvent impurities which may be picked up such, for example, as small pieces of metal and carbon. These solvent impurities may be either discarded or subjected to salvage treatment in order to recover any occluded uranium. As shown in Fig. 2, the sieved wash water may then be passed directly to the evaporation stage, or if desired it may first be treated with $H_2O_2$ by adding a slight excess of 10% $H_2O_2$ and agitating this solution in order to oxidize the various contained materials.

For example, the wash water prior to the step of oxidation may contain suspended $U(OH)_4$ and bits of copper and carbon; dissolved uranium in the $+4$ and $+6$ valence states, as well as dissolved copper, iron, nickel, chromium, and possibly other metals in one or more of the positive valence states. Hence, as a result of oxidation all of the uranium is put in solution as uranyl ion, suspended copper is put in solution as cupric ion, and other dissolved materials are put in their higher stable valence states if they are not already in such state. Carbon is not oxidized by this treatment. The effect of the oxidation on the various materials contained in the wash solution may be indicated as follows:

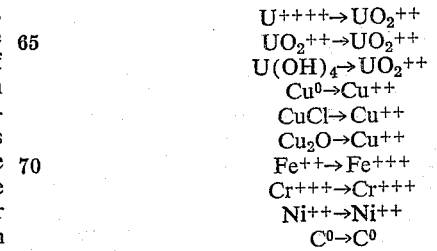
$$U^{++++} \rightarrow UO_2^{++}$$
$$UO_2^{++} \rightarrow UO_2^{++}$$
$$U(OH)_4 \rightarrow UO_2^{++}$$
$$Cu^0 \rightarrow Cu^{++}$$
$$CuCl \rightarrow Cu^{++}$$
$$Cu_2O \rightarrow Cu^{++}$$
$$Fe^{++} \rightarrow Fe^{+++}$$
$$Cr^{+++} \rightarrow Cr^{+++}$$
$$Ni^{++} \rightarrow Ni^{++}$$
$$C^0 \rightarrow C^0$$

Accordingly, the oxidized wash water contains at least the following: $UO_2^{++}$, $Cu^{++}$, $Fe^{+++}$, $Cr^{+++}$, $Ni^{++}$ and $C^0$ (carbon). The oxidized wash water is then filtered in order to remove $C^0$, which may be discarded or subjected to salvage treatment in order to recover any occluded uranium.

In the event this filtrate is rather dilute, it may be concentrated by evaporation; otherwise this step is omitted. In the event the filtrate is concentrated by evaporation, the water vapor which is driven off is condensed and to it is added enough makeup water in order to provide a new wash solution, which is used again to wash the parts of the calutron disposed in the source region thereof, in the manner previously explained. This step, comprising condensing and re-using the water vapor which is driven off the filtrate incident to concentration by evaporation, is advantageous in view of the fact that any uranium entrained in the water vapor is not lost to the outside. The original filtrate mentioned above, or the concentrated filtrate following evaporation, in the event this step is employed, is then stored for further treatment.

It will be understood that the stored water wash derived from the parts of the first-stage calutron disposed in the source region thereof, as explained above, comprises uranium of natural or normal composition with reference to $U^{235}$; while the stored water wash derived from the parts of the second-stage calutron disposed in the source region thereof, as explained above, comprises uranium which is singly enriched with $U^{235}$.

Considering now the details of the recovery of the metallic uranium, singly enriched with $U^{235}$, from the first pocket of the collector of the first-stage calutron, or of the metallic uranium, doubly enriched with $U^{235}$, from the first pocket of the collector of the second-stage calutron, reference is made to the portion of the flow diagram illustrated in Fig. 3. The inner surfaces of the first pocket of the collector of the calutron are etched with one of a number of acid solutions, whereby the deposit of metallic uranium, either singly or doubly enriched with $U^{235}$, is dissolved; and various impurities including iron, chromium and nickel are introduced in the acid wash solution, due to the fact that the inner surfaces of the first pocket of the collector of the calutron which are thus etched with the acid solution are formed of stainless steel which comprises the materials mentioned. Accordingly, the wash acid contains at least the following ions: $UO_2^{++}$, $Fe^{+++}$, $Cr^{+++}$, and $Ni^{++}$.

A suitable acid wash solution which may be employed for the purpose mentioned comprises an aqueous solution containing $HNO_3$ (approximately 12%). Another suitable acid wash solution comprises an aqueous solution containing $HCl$ (approximately 2%) and $H_3O_2$ (approximately 0.5%). A further suitable acid wash solution comprises an aqueous solution containing $H_2SO_4$ (approximately 18%) and $H_2O_2$ (approximately 10%). Thus, it will be understood that the first acid wash solution comprises an oxidizing acid, whereas the second and third acid wash solutions comprise a separate oxidizing agent in the form of $H_2O_2$. Hence, the acid wash solution employed in any case produces an oxidizing effect upon both the uranium and the metal impurities which are dissolved therein.

In the event the wash acid is rather dilute in the ions mentioned, it may be concentrated by evaporation; otherwise this step is omitted. In the event the wash acid is concentrated by evaporation, the vapor which is driven off is condensed and to it is added enough makeup $HNO_3$, or $HCl$ and $H_2O_2$, or $H_2SO_4$ and $H_2O_2$, depending upon the composition of the original wash acid employed, in order to provide a new wash acid which is again used to wash the first pocket of the collector of the calutron, in the manner previously explained. This step, comprising condensing the vapor which is driven off the wash acid incident to concentration by evaporation, is advantageous in view of the fact that any uranium entrained in the vapor is not lost to the outside. The original wash acid mentioned above, or the concentrated wash acid following evaporation, in the event this step is employed, is then stored for further treatment.

It will be understood that the stored acid wash derived from the first pocket of the collector of the first-stage calutron, as explained above, comprises uranium which is singly enriched with $U^{235}$; while the stored acid wash derived from the first pocket of the collector of the second-stage calutron, as explained above, comprises uranium which is doubly enriched with $U^{235}$.

The metallic uranium, impoverished with respect to $U^{235}$ and deposited in the second pocket of the collector of the first-stage calutron, may be recovered merely by etching the inner surfaces of the second pocket of this collector with a suitable wash acid of the character mentioned above, whereby this deposit of metallic uranium is dissolved. This acid wash is then discarded, as it contains so little $U^{235}$ that further processing thereof is not feasible.

On the other hand, the metallic uranium which has been first enriched with respect to $U^{235}$ and subsequently impoverished with respect to $U^{235}$, and deposited in the second pocket of the collector of the second-stage calutron, may be recovered by etching the inner surfaces of the second pocket of this collector with a suitable wash acid of the character mentioned above, whereby this deposit of metallic uranium is dissolved; and various impurities, including iron, chromium and nickel are introduced in the acid wash solution, due to the fact that the inner surfaces of the second pocket of the collector of the calutron which are thus etched with the acid solution are formed of stainless steel which comprises the materials mentioned. Accordingly, the wash acid contains at least the following ions: $UO_2^{++}$, $Fe^{+++}$, $Cr^{+++}$ and $Ni^{++}$. The considerations concerning whether the wash acid should be concentrated are the same as those previously noted. In any case, either the original wash acid mentioned above, or the concentrated wash acid following evaporation, in the event this step is employed, is then analyzed in order to determine the $U^{235}$ content thereof. In the event the analysis indicates that the $U^{235}$ content of this wash acid is at least as great as natural or normal uranium, it is stored for further treatment; on the other hand, in the event the analysis indicates that the $U^{235}$ content of this wash acid is less than that of natural or normal uranium, it is discarded, as further processing thereof is not feasible.

To the stored water wash solution derived from the parts of the first-stage calutron disposed in the source region thereof, there is added the stored acid wash solution derived from the second pocket of the collector of the second-stage calutron in order to produce a first composite solution; this first composite solution comprises uranium of substantially natural or normal composition with reference to $U^{235}$. Also, to the stored water wash solution derived from the parts of the second-stage calutron disposed in the source region thereof, there is added the stored acid wash solution derived from the first pocket of the collector of the first-stage calutron in order to produce a second composite solution; this second composite solution comprises uranium which is singly enriched with $U^{235}$. Finally, the stored acid wash solution derived from the first pocket of the collector of the second-stage calutron constitutes a third composite solution; this third composite solution comprises uranium which is doubly enriched with $U^{235}$.

Considering now the details of the purification steps of the instant process, in which uranium is treated in a calutron and composite solutions are produced as has been described in the foregoing, reference is made to the portion of the flow diagram illustrated in Fig. 4.

The solutions referred to in connection with Figs. 2 and/or 3 may comprise the following ions: $UO_2^{++}$, $Fe^{+++}$, $Cr^{+++}$, $Cu^{++}$, and $Ni^{++}$. In accordance with the instant process, a solution comprising these ions is subjected to treatment with excess $NH_3$ gas or carbonate-free $NH_4OH$, whereby $(NH_4)_2U_2O_7$, $Fe(OH)_3$, and $Cr(OH)_3$ are precipitated away from most of the copper and nickel that remain in solution in the form of ammonio complex ions, $Cu(NH_3)_4^{++}$ and $Ni(NH_3)_4^{++}$.

The solution is filtered, and the filtrate comprising the complexed copper and nickel ions is discarded or, if desired, it may be subjected to further salvage treatment. The separated precipitate, comprising ammonium diuranate, ferric hydroxide and chromic hydroxide, is preferably washed with water containing about 1% $NH_4OH$ and 1% $NH_4NO_3$ to free such precipitate from all but minute quantities of copper or nickel. The washed precipitate is then placed in the reaction zone of a combined reactor and fractional condenser, where the remaining steps of separation, including chlorination and condensation, are carried out.

The above-mentioned steps of chlorination and fractional condensation may be very advantageously carried out in an apparatus of the type illustrated in Fig. 5, wherein 101 is a container for an inert gas, such as nitrogen or carbon dioxide, having a shutoff valve 102 and communicating with flash chamber 104 through a conduit 103; 106 is a container for a chlorinating agent, e.g., $CCl_4$, and is provided with a conduit 107 which leads into the flash chamber 104. An adjustable electrical heating element 105 is arranged in heat exchange relation with flash chamber 104. A conduit 108 leaves flash chamber 104 and enters a cylindrical Pyrex or other heat-resistant glass tube 109 having a spiral baffle 110 disposed near its inlet and a reaction charge tray 113 located near its central portion. Approximately midway of the tube 109 a funnel-shaped element 111, formed of Pyrex or other heat-resistant glass is sealed to the tube 109 and constitutes an outlet for reaction gases formed in the reaction zone proper; the reaction zone, R, being defined by the walls of the tube 109 lying between the baffle 110 and the funnel-shaped element 111. A condensing chamber comprising a cylindrical outer wall 114, a truncated conical inner wall 115, an inlet tube 116 and an outlet tube 117 for circulating a cooling fluid, such as air, communicates with the reaction chamber. A thermocouple 118 extends through the outlet tube 117 and into close proximity with the inner condenser wall 115, in order to permit measurement of the temperature within the condensing chamber. It will be understood that the condensing zone proper, indicated by C in Fig. 5, is defined substantially by the conical inner wall 115.

As shown, an electric furnace 112 surrounds that portion of the apparatus extending approximately from the end of the spiral baffle 110 to the posterior portion of the condensing chamber. This furnace comprises two adjoining sections provided with separately controlled windings, 112a and 112b, of electrical heating elements, in order to permit raising and maintaining different parts of the apparatus at different temperatures. Thus, the winding 112a is adjacent the reaction zone, while the winding 112b is adjacent the condensing zone, thereby permitting these respective zones to be held at appropriate operating temperatures at will.

The condensing chamber is provided with an outlet 119 leading into a collector 120 which in turn communicates through a conduit 121 with a conventional electrostatic precipitator 122. This precipitator is provided with a dust collector 123 and a gas outlet 124.

Figs. 6 and 7 are cross-sections taken on the lines 6—6 and 7—7 of Fig. 5, and assist in more clearly showing the construction and arrangement of the condensing chamber and the reaction chamber, respectively.

In carrying out the steps of chlorination and fractional condensation as outlined in Fig. 4, the precipitate prepared as described above is placed on the reaction charge tray 113, the electric furnace 112 is turned on, and the charge is heated slowly to a temperature of approximately 125° C. until completely dry. The electric furnace 112 is then adjusted so as to bring the temperature within the reaction zone to between approximately 500° and 600° C., and preferably about 525° C.

When the reaction chamber and charge have reached a temperature of about 525° C. liquid carbon tetrachloride from container 106 and an inert gas from container 101 are passed through the respective conduits 107 and 103 into flash chamber 104 where the $CCl_4$ is vaporized. The mixture of vaporized carbon tetrachloride and inert gas passes through the conduit 108 and into the tube 109 where, in passing through the region containing the spiral baffle 110, a more thorough mixing of the components is effected. The intimate mixture of $CCl_4$ and inert gas then passes over the charge in the reaction zone R. At the temperature indicated, carbon tetrachloride readily reacts with the uranium, iron and chromium compounds present in the charge to form a vapor mixture of volatile chlorides, the uranium being present as $UCl_4$ and $UCl_5$ (chiefly the latter), the iron as $FeCl_3$, and the chromium probably as $CrCl_4$. Under the specified reaction conditions substantially complete chlorination and volatilization of the uranium, iron and chromium in the form of their chlorides is accomplished, leaving behind in the charge boat any slight residue of copper and nickel that might have been carried forward with the precipitate, as well as any other impurities non-volatile under the conditions obtaining.

The vapor mixture comprising $UCl_4$, $UCl_5$, $FeCl_3$, and $CrCl_4$ passes out of the reaction zone R through the funnel-shaped outlet 111 and enters the condensing zone C.

It has been found most desirable to maintain the condensing zone C at a temperature between approximately 300° and 400° C., and preferably at a temperature of about 325° C. This temperature is relatively easy to maintain by circulating a cooling fluid, such as air, through the tubes 116 and 117 into the region between the inner wall 115 and the outer wall 114 of the condensing chamber, particularly in conjunction with the appropriate control of the separate electric furnace windings 112b. At the temperature mentioned, uranium pentachloride is very largely, if not substantially completely, decomposed to the much less volatile uranium tetrachloride, while the conversion of the $CrCl_4$ to the less volatile $CrCl_3$ takes place only to a minor extent. Accordingly, an effective separation of uranium from iron and chromium takes place, the bulk of the uranium being deposited in the condensing zone C as the solid tetrachloride, while the iron, as $FeCl_3$, and the chromium, as $CrCl_4$, pass through the fractional condensing zone in vapor form, together with any relatively small remnant of uranium as has not been converted from the more volatile pentachloride to the less volatile tetrachloride under the conditions obtaining in the condensing zone.

The completion of the decomposition of $UCl_5$ to $UCl_4$ in the condensing zone, and consequently the degree of deposition of the latter therein, can be regulated by controlling the rate of gas flow through the condensing zone. At practicable flow rates substantially all of the uranium will be converted to the less volatile tetrachloride and deposited as such on the inner wall 115 of the condensing chamber. However, under ordinary conditions it is to be expected that a small quantity of unconverted uranium pentachloride will remain as colloidal smoke dispersed throughout the gas mixture leaving the condensing zone.

Whereas at a temperature of approximately 300° to 400° C., and preferably about 325° C., in the condensing zone, uranium tetrachloride is formed and precipitated out, ferric chloride and chromium tetrachloride remain as vapors and, together with undecomposed uranium pentachloride smoke, pass out through conduit 119 and into collector 120, which functions as an air-cooled condenser sufficient to condense ferric and chromic chlorides (the latter, $CrCl_3$, formed from $CrCl_4$ upon cooling), as well as at least a portion of the $UCl_5$ smoke. It may be found advantageous to use additional cooling means for the collector 120, e.g., a $CO_2$-acetone mixture or the like. In any event, highly dispersed particles, such as particles of $UCl_5$, remaining in admixture with gases still uncondensed, escape from collector 120 through conduit 121 and pass into the electrostatic precipitator 122 where they are precipitated from the residual gases, and are collected in the dust collector 123. The residual gases leave the system via the outlet 124.

Although the $UCl_4$ deposited in the condensing zone C generally is relatively pure, it is possible that minute quantities of iron and chromium, in the form of their chlorides, may be present as contaminants. In such case, the $UCl_4$ product may be subjected to an additional purification procedure comprising fractional sublimation in vacuo.

Inasmuch as the materials deposited in the collector or air condenser 120 and in the electrostatic precipitator 122 may contain small quantities of uranium, such as in the form of the pentachloride, these materials may be subjected to further salvage operations for the reclamation of residual uranium contained therein. Insofar as regards the $UCl_5$ dust recovered in the electrostatic precipitator 122, it is generally satisfactory merely to subject it to an elevated temperature sufficient to convert it to $UCl_4$ (see Fig. 4) which can then be processed in the calutron or otherwise utilized, as desired.

It should be noted that certain modifications may be made in the procedure that has been described in the foregoing. For example, the carbon tetrachloride may or may not be carried by an inert gas such as nitrogen or carbon dioxide. Also, whereas it is preferred to carry out the reaction at substantially atmospheric pressure, lower or higher pressures may be resorted to as desired. Further, it may be found convenient and desirable to reduce the precipitate to a granular, pulverized form prior to contacting the precipitate with a chlorinating agent in the reaction zone R.

It will be understood that the purification of the first composite solution in the manner described above is productive of a first batch of uranium tetrachloride containing uranium of natural or normal composition with reference to $U^{235}$. Also, the purification of the second composite solution in the manner described above is productive of a second batch of $UCl_4$ containing uranium which is singly enriched with $U^{235}$. Finally, the purification of the third composite solution in the manner described above is productive of a third batch of $UCl_4$ containing uranium which is doubly enriched with $U^{235}$. The first and second batches of $UCl_4$ are utilized as charging stock for first-stage and second-stage calutrons, respectively; while the third batch of $UCl_4$ is available for commercial use.

In view of the foregoing, it is apparent that there has been provided an improved process for recovering, reclaiming, purifying, and converting uranium, both in metallic and compound form, in conjunction with the calutron method, whereby uranium enriched with $U^{235}$ may be produced on a large scale in commercial quantities.

The term "uranium" is employed in the present specification and claims in a generic sense, i.e., as applying to uranium whether present in elemental, ionic, or compound form, unless indicated otherwise by the context. Furthermore, the terms "ammonia" and "ammonium hydroxide" are used interchangeably, so that the use of either term is to be construed as covering the use of both substances, unless the contrary is indicated by the context.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. The process of reclaiming uranium values from deposits formed with a stainless steel surface comprising washing said surface with a solvent for the uranium, whereby metal impurities including iron, chromium, nickel, and copper derives from the stainless steel surface are introduced into the wash solution, treating the wash solution so formed with ammonia to precipitate $(NH_4)_2U_2O_7$, $Fe(OH)_3$ and $Cr(OH)_3$ with traces of occluded nickel and copper away from the solution comprising nickel and copper ammonio complex ions, separating said solution from said precipitate, rendering said precipitate substantially anhydrous, contacting said precipitate with carbon tetrachloride at an elevated temperature of approximately 500° to 600° C. to form a vapor mixture comprising $UCl_4$, $UCl_5$, $CrCl_4$, and $FeCl_3$ and leave a small residue of nickel and copper; passing said vapor mixture into a condensation zone maintained at a temperature of approximately 300° to 400° C. whereby less volatile $UCl_4$ is formed and deposited in said condensation zone and the more volatile chlorides of the remaining impurities remain in vapor phase, together with residual $UCl_5$ smoke, passing said more volatile material and $UCl_5$ smoke into a still lower temperature condensing zone whereby $FeCl_3$, $CrCl_3$, and at least a portion of $UCl_5$ smoke are condensed; and passing the residual gases containing any remaining $UCl_5$ smoke through an electrostatic precipitator to precipitate substantially all of the remaining $UCl_5$.

2. The process of reclaiming uranium values from deposits formed with a stainless steel surface comprising washing said stainless steel surface with a solvent for the uranium, whereby metal impurities including iron, chromium, nickel, and copper derived from said stainless steel surface are introduced into the wash solution, treating the wash solution so formed with ammonia to precipitate $(NH_4)_2U_2O_7$, $Fe(OH)_3$ and $Cr(OH)_3$ with traces of occluded nickel and copper away from the solution comprising nickel and copper ammonio complex ions, separating said solution from said precipitate, rendering said precipitate substantially anhydrous, contacting said precipitate with carbon tetrachloride at an elevated temperature of about 525° C. to form a vapor mixture comprising $UCl_4$, $UCl_5$, $CrCl_4$, and $FeCl_3$ and leave a small residue of nickel and copper; passing said vapor mixture into a condensation zone maintained at a temperature of approximately 325° C. whereby less volatile $UCL_4$ is formed and deposited in said condensation zone and the more volatile chlorides of the remaining impurities remain in vapor phase, together with residual $UCl_5$ smoke, passing said more volatile material and $UCl_5$ smoke into a still lower temperature condensing zone whereby $FeCl_3$, $CrCl_3$, and at least a portion of $UCl_5$ smoke are condensed; and passing the residual gases containing any remaining $UCl_5$ smoke through an electrostatic precipitator to precipitate substantially all of the remaining $UCl_5$.

3. The process of reclaiming uranium values from an oxidized acidic solution containing metal impurities including iron, chromium, nickel and copper comprising treating the solution with ammonia to precipitate $(NH_4)_2U_2O_7$, $Fe(OH)_3$ and $Cr(OH)_3$ away from nickel and copper impurities remaining as ammonio complex ions in the solution, separating the precipitate from the solution, chlorinating said precipitate at an elevated temperature to produce therefrom a volatilized mixture of $UCl_4$ and $UCl_5$ with $FeCl_3$ and $CrCl_4$, and passing said volatilized mixture through a condensation zone maintained at a temperature lower than the aforesaid elevated temperature whereby the less volatile $UCl_4$ is formed and deposited in said condensation zone and the more volatile iron and chromium impurity chlorides remain in the effluent mixture, and recovering said $UCl_4$.

4. The process of claim 3 wherein said elevated temperature of chlorination is in the range from 500° to 600° C.

5. The process of claim 3 wherein said elevated temperature of chlorination is about 525° C. and said condensation zone is maintained at a temperature of about 325° C.

6. The process as defined in claim 3 wherein said elevated temperature of chlorination is in the range of approximately 500° to 600° C. and said lower temperature of the condensation zone is in the range of approximately 300° to 400° C.

7. The process of reclaiming uranium values associated with metal impurities including iron, chromium, nickel and copper comprising producing an oxidized acidic solution of the uranium values and said impurities, treating the solution with ammonia to precipitate $(NH_4)_2U_2O_7$, $Fe(OH)_3$ and $Cr(OH)_3$ away from nickel and copper impurities which remain as ammonio complex ions in the solution, separating the precipitate from the solution, contacting said precipitate with an admixture of carbon tetrachloride vapor and an inert gas at a temperature of between approximately 500° and 600° C. to form a vapor mixture of uranium pentachloride and more volatile chromium and iron chlorides, fractionating said mixture by cooling to a temperature of between approximately 300° to 400° C. thereby converting said uranium pentachloride to tetrachloride which is precipitated therein away from the chromium and iron chlorides, and recovering said uranium tetrachloride.

8. The process as defined in claim 7, wherein said inert gas which is in admixture with the carbon tetrachloride vapor is nitrogen.

9. The process as defined in claim 7, wherein said inert gas which is in admixture with the carbon tetrachloride vapor is carbon dioxide.

10. The process of recovering uranium values from residual deposits of a water soluble uranium compound formed on stainless steel surface comprising washing the said surface with water to dissolve the uranium values, whereby impurities including iron, chromium, nickel and copper are introduced into the wash solution, treating the solution with ammonia to precipitate uranium, iron and chromium away from nickel and copper impurities in the solution, separating the precipitate from the solution, contacting the precipitate with carbon tetrachloride vapor in admixture with an inert gas at a temperature of between approximately 500° and 600° C. to produce a vaporous mixture of uranium chlorides and iron and chromium chloride, cooling the vapor mixture to a temperature of between approximately 300° and 400° C. to produce and precipitate uranium tetrachloride away from the more volatile iron and chromium chlorides remaining in the vapor mixture, and recovering the uranium tetrachloride from the vapor mixture.

11. The process of recovering uranium values from residual deposits of a water soluble uranium compound formed on stainless steel surface comprising washing the said surface with water to dissolve the uranium values, whereby impurities including iron, chromium, nickel and copper are introduced into the wash solution, treating the solution with ammonia to precipitate uranium, iron and chromium away from nickel and copper impurities in the solution, separating the precipitate from the solution, contacting the precipitate with carbon tetrachloride vapor in admixture with an inert gas at a temperature of between approximately 500° and 600° C. to produce a vaporous mixture of uranium chlorides and iron and chromium chlorides, cooling the vapor mixture to a temperature of between approximately 300° and 400° C. to produce and precipitate uranium tetrachloride away from the more volatile iron and chromium chlorides remaining in the vapor mixture together with residual $UCl_5$ smoke, passing the remaining vapor mixture into a still lower temperature condensing zone whereby $FeCl_3$, $CrCl_3$ and at least a portion of the $UCl_5$ smoke are condensed, and passing the residual gases through an electrostatic precipitator to precipitate substantially all of the remaining $UCl_5$.

12. The process as defined in claim 10 wherein said contacting of the precipitate wtih the admixture of carbon tetrachloride vapor and inert gas is conducted at a temperature of about 525° C. and said cooling of the vapor mixture is to a temperature of about 325° C.

References Cited in the file of this patent

UNITED STATES PATENTS

| | | |
|---|---|---|
| 1,181,411 | Schlundt | May 2, 1916 |
| 1,434,485 | D'Adrian | Nov. 7, 1922 |

OTHER REFERENCES

Friend: "Textbook of Inorganic Chemistry," vol. 7, part 3, pp. 294, 307 (1926), publ. by Charles Griffin & Co., Ltd., London.

Perry: "Chemical Engineer's Handbook," 2nd ed., page 1868 (1941) McGraw-Hill, N.Y.